Oct. 23, 1951 T. K. GREENLEE 2,572,136
MULTIPLE TEMPERATURE CONTROL SYSTEM
Filed July 29, 1950
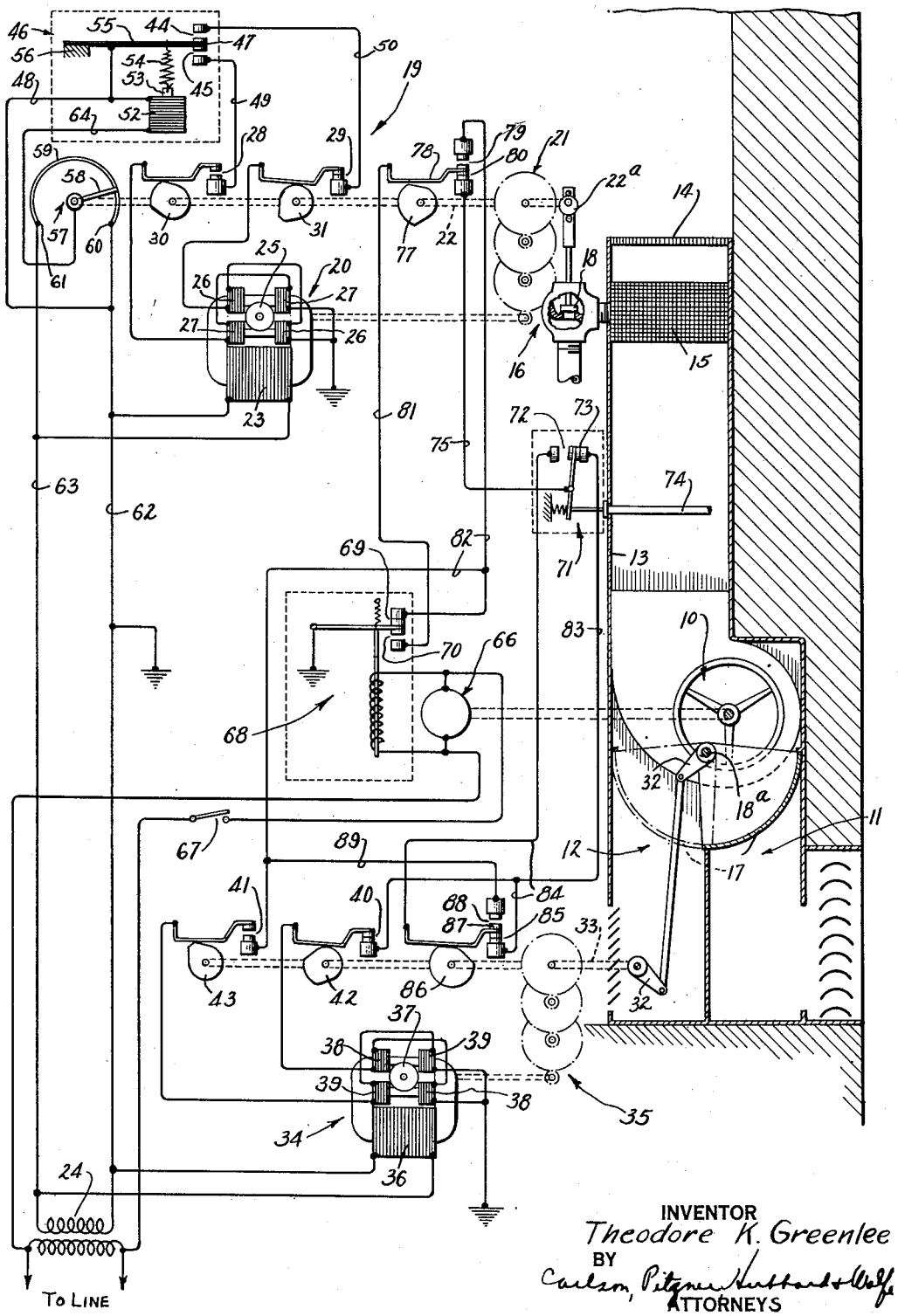
INVENTOR
Theodore K. Greenlee
BY
Carlson, Pitzner Hubbard & Wolf
ATTORNEYS Patented Oct. 23, 1951

2,572,136

UNITED STATES PATENT OFFICE 2,572,136

MULTIPLE TEMPERATURE CONTROL SYSTEM

Theodore K. Greenlee, Rockford, Ill., assignor to Barber-Colman Company, Rockford, Ill., a corporation of Illinois Application July 29, 1950, Serial No. 176,743

5 Claims. (Cl. 236—37)

1

This invention relates to the automatic control of a plurality of condition control devices in response to changes in a plurality of temperature conditions and has particular reference to a system for varying the proportion of fresh and recirculated air delivered to a variable capacity heater.

One object is to provide an automatic control for adjusting the position of the damper in accordance with the temperature of the fresh air under certain conditions and at other times in accordance with the capacity of the air heater.

A more detailed object is to provide a control of the above character for normally maintaining a predetermined amount of fresh air in the mixture and varying such amount in accordance with the fresh air temperature while interrupting the supply of fresh air when the heater is operating near full capacity.

The invention also resides in the simple and novel manner of transferring the control of the damper operator to and from the thermostat which responds to the fresh air temperature.

Other objects and advantages of the invention will become apparent from the following detailed description taken in connection with the accompanying drawing which is a schematic view and wiring diagram of temperature regulating apparatus incorporating the improved automatic control.

For purposes of illustration, the invention is shown on the drawing for controlling an air conditioning apparatus of the so-called unit ventilator type wherein fresh or recirculated air or a mixture of both is drawn by a power driven blower 10 through inlets 11 and 12 in a casing 13 and discharged through the casing outlet 14 into a room or space to be conditioned after passing through an exchanger or heater 15. The latter may comprise a radiator supplied with conditioning fluid from a source (not shown) through a control valve 16.

The proportion of fresh air in the mixture delivered to the heater 14 is determined by the position of a regulating member in the form of a segmental damper 17 fast on a rockshaft 18ª and swingable from the full-heating position shown in which a fresh air inlet 11 is fully closed to a full-cooling position in which this inlet is fully opened and the recirculating air inlet 12 is fully closed. The conditioning capacity of the unit ventilator and therefore the temperature of the air delivered to the room will vary with the changes in the combined positions of the valve 16 and the damper 17.

2

The movable element 18 of the valve is arranged to be oscillated varying distances back and forth by a reversible electric actuator 19 which, in the present instance, includes a motor 20 operating through speed reduction gearing 21 to drive a shaft 22 carrying a cam 22ª whose follower is on the stem of the movable valve element 18. Preferably, the motor is of the shaded pole induction type having a winding 23 constantly energized from a low voltage source 24 of alternating current and a rotor 25 arranged to turn clockwise and counterclockwise respectively according to which two sets of shading coils 26 and 27 is short circuited, the motor remaining idle when both sets of coils are open circuited. The range of turning of the operating shaft 22 is determined by limit switches 28 and 29 which are opened by cams 30 and 31 when the valve is fully closed and fully opened respectively.

Through suitable cranks 32 and a connecting link the damper 17 is positioned in response to turning of a shaft 33 driven through speed reduction gearing from the motor 34 of an operator 35. The latter is also of the shaded pole type having a constantly energized winding 36 and a rotor 37 which turns clockwise and counterclockwise respectively according to which of two shaded coils 38 and 39 is short circuited. As in the case of the valve operator, the circuits through the shaded coils are controlled by limit switches 40 and 41 which are opened by their cams 42 and 43 respectively when the damper 17 is in the limit position shown in full in the drawing and in the other limit position shown in phantom in which the return air inlet 12 is fully closed and the fresh air inlet 11 is fully opened. In all other positions of the damper, the respective switches are closed.

The valve element 18 is moved back and forth through its operating range with a so-called proportioning action by controlling the operation of the motor 20 to position the shaft 22 progressively with changes in the controlling condition which may be the temperature within the room being heated. To this end, the direction and extent of operation of the motor are controlled by switches 44 and 45 actuated selectively by a balanced electromagnetic relay 46, the balanced condition of which is governed by changes in the room temperature and in the position of the shaft 22. The common contact 47 of the switches is connected by a conductor 48 to the ground and therefore to the common terminal of the shading coils 26 and 27 and conductors 49 and 50 extend from the stationary contacts through the limit switches 28 and 29 to the insulated terminals of the shaded coils. The stationary contacts are spaced to provide a small clearance between the cooperating contacts of the two switches in the neutral position of the contact 47 in which both switches are open.

Herein, the relay 46 comprises a solenoid 52 continually energized during operation of the control and having a plunger armature 53 which is connected to one end of a light contractile spring 54. The other end of the spring is fastened to a tongue 55 anchored at 56 and carrying the contact 47 at its free end. The balanced condition of the relay 46 may be controlled by the room temperature in various ways as for example by constructing the tongue 55 of bimetallic material. The stress in the tongue thus counteracts the pull of the solenoid 52 so that for a given degree of energization of the latter, the contact 47 will remain in neutral position at a predetermined ambient temperature, will move upwardly to close the switch 44 by warping of the tongue upon a temperature fall below such value, and will move to close the switch 45 when the temperature rises above the equilibrium value. The element 55, the switches 45 and 46, and the solenoid thus constitute a thermostat, the effective control point of which may be varied manually in the usual way to change the value of the control temperature which is maintained in the room.

Following upsetting of the relay balance by a change in the room temperature, the energization of the relay winding 52 is changed automatically in a direction to restore the relay balance. Herein this is effected by a rheostat 57 having a wiper arm 58 fast on the shaft 22 and movable across a resistance element 59. Opposite terminals 60 and 61 of the resistance are connected to the current source 24 by conductors 62 and 63, the former also being connected to the conductor 48 which leads to the thermostat tongue and one terminal of the solenoid 52. The other solenoid terminal is joined by a conductor 64 to the rheostat arm 58.

With this arrangement, the degree of energization of the solenoid will at any time be determined by the voltage drop between the wiper arm 58 and the terminal 60. Accordingly, as the shaft 22 turns in a clockwise direction as it will in response to closure of the switch 45 resulting from a rise in temperature above the prevailing balanced value, the voltage drop applied to the solenoid will decrease thereby decreasing the tension on the spring 54 and permitting the thermostatic element to maintain the relay balance at a higher ambient temperature. Operation of the motor 20 will be continued by the switch 45 until the resulting decrease in the pull of the solenoid just balances the changed stress in the thermostatic tongue at the new ambient temperature.

Conversely, during reverse operation of the motor 20 in response to closure of the thermostat switch 44 by a fall in the ambient temperature below the equilibrium value, the shaft 22 will turn counterclockwise, and the voltage impressed on the solenoid will increase progressively causing a greater solenoid pull to be exerted. Equilibrium of the solenoid pull and stress of the element 55 will then be established at a lower controlling temperature. As a result of this proportioning action, the shaft 22 will move back and forth with changes in the ambient temperature and will assume an infinite number of different positions each corresponding to a predetermined temperature of the thermostatic element 55. The degree of opening of the valve 16 and therefore the heating capacity of the radiator will be proportioned in accordance with the room temperature changes over a narrow range.

The blower 10 is driven by a motor 63 which is energized in response to closure of a manually operated switch 67 which also energizes a relay 68 to open a switch 69 and close a switch 70. In accordance with the present invention, the latter operates in conjunction with a second thermostat 71 to control the damper actuating motor 34. This thermostat includes two switches 72 and 73 which are respectively closed and opened when the ambient temperature detected by an element 74 is below a predetermined value, for example 55 degrees F. The element 74 may as shown be exposed to the mixture of fresh and recirculated air or, if desired, may be subjected to the temperature of the fresh air alone.

The common contact of the switches 72 and 73 is moved by the element 74 and connected to a conductor 75 leading to a switch 80 which is open when the valve 16 is fully open and closed either when the valve is partially open or is closed as shown. This is effected by a cam 77 fast on the shaft 22 and acting on a follower 76 carrying the common contact of two switches 79 and 80. The movable contact of the switch 80 is joined by a conductor 81 to the ungrounded contact of the relay switch 70. The stationary contact of the switch 79 is connected by a conductor 82 to the stationary contact of the relay switch 69 and also to the stationary contact of the limit switch 41 of the damper operator. Closure of the switch 79 when the valve 16 is wide open completes a circuit through the limit switch 41 to energize the motor 34 and initiate closing of the fresh air inlet 11.

The stationary contact of the switch 73 of the fresh air responsive thermostat 71 is joined by a conductor 83 to the stationary contact of the switch 40 by which the operation of the motor 34 is interrupted when the fresh air damper is fully opened. A branch 84 of this conductor extends to the stationary contact of the thermostat switch 72 and includes a switch 85 whose movable contact 87 is controlled by a cam 86 on the damper operator shaft 33. This switch is closed when the fresh air damper is in closed position and remains closed until the damper reaches a predetermined partially open position corresponding to the minimum amount of fresh air which it is normally desirable to admit to the room. Beyond this position of the damper, the switch 85 is opened and the associated switch 88 is closed. The stationary contact of the latter is connected by a conductor 89 to the conductor 82 above referred to.

*Operation*

The apparatus described above operates as follows assuming that the thermostat 71 is set for a control point of 55 degrees F. and that the parts are in the positions shown in the drawing with the blower motor stopped, the steam valve 16 closed, and the fresh air damper fully closed. Closure of the switch 67 to start the blower also energizes the relay 68 closing the switch 70 to place the damper operator 35 under the control of the mixed air thermostat 71. If at this time the temperature of the element 74 is above 55 degrees F., the switch 73 will be closed thus completing a circuit for the motor coils 38 from the ground through the switch 70, the then closed switch 80 of the valve actuator, the conductor 75, the switch 73, the conductor 83, and then closed limit switch 40. The fresh air damper 17 is moved to the fully opened minimum position at which the motor circuit is broken by opening of the switch 40 by the cam 42.

If, at the time that the blower is started, the room temperature is below the control range of the thermostat 46, the switch 44 will be closed thus completing a circuit for the motor windings 26 through the then closed limit switch 29. The actuator 19 will then normally operate to fully open the valve 16 before the room thermostat as adjusted in the ensuing action of the rheostat 57 is satisfied. As the valve becomes fully opened, the cam 77 opens the switch 80 thus withdrawing the damper operator from the control of the thermostat 71. At the same time, the switch 79 is closed establishing an independent circuit for energizing the motor windings 39 and extending through the switch 70, the conductor 81, the switch 79, the conductor 82, and the switch 41 which is then closed. The fresh air damper is thus moved to fully closed position and there held so long as the valve 16 remains fully open so as to hold the switch 79 closed. At this time, the unit ventilator operates at full heating capacity since only recirculated relatively warm air is forced through the heater.

When the room temperature is raised to within the proportioning range of the room thermostat and the switch 45 becomes closed, the valve actuator is energized in a direction to close the valve 16. The extent of such closing varies in proportion to the prevailing room temperature as a result of the balancing action of the relay 46. Thus, the position of the valve is shifted back and forth with and in proportion to the changing heating requirements of the room, and the temperature of the latter is maintained within the relatively narrow proportioning range of the room thermostat.

Any movement of the valve element 18 away from the fully open position by operation of the motor 20 will result in opening of the switch 79 and closure of the switch 80. As a result of the latter, the control of the damper operator 35 is transferred back to the thermostat 71 and the latter operates to cause movement of the fresh air damper to either the minimum position or fully open position depending on the prevailing temperature of the fresh or outside air. If the latter is low enough to cause closure of the thermostat switch 72, the operator 35 will be energized through the then closed switch 85 and the limit switch 40. The motor 34 thus runs in a direction to open the fresh air damper, this motion being terminated by opening of the switch 85 when the damper reaches the position determined by the shape of the cam 86 at which position the desired minimum amount of fresh air is admitted to the heater casing.

If, at the time the control of the damper operator is transferred to the thermostat 71, the temperature of the outside air is sufficiently high to produce and maintain the thermostatic element 74 above 55 degrees F., the switch 73 will be closed and the motor 34 will be operated to fully open the fresh air inlet. In this case, the short circuit for the windings 38 is through the switches 70, 80, 73, and 40 and remains closed until the damper reaches the position shown in phantom in which the fresh air inlet is fully open so that only fresh air is forced through the heater. The circuit is broken by opening of the switch 40 and the damper position is maintained so long as the thermostat 71 remains above 55 degrees F.

It will be seen from the foregoing that the improved control operates positively and reliably to prevent the circulation of fresh air when the heating demand is at a maximum as evidenced by full opening of the steam valve 16, to maintain a predetermined minimum supply of fresh air when the heating demand is less than a maximum and the temperature of the fresh air is more than a predetermined amount below the desired room temperature, and to increase the amount of fresh air to a maximum whenever the temperature of the latter is sufficiently close to the desired room temperature. The capacity of the heating apparatus is thus adjusted to suit changing weather conditions while always supplying as large a proportion of fresh air as possible consistent with economy of operation of the entire system.

I claim as my invention:

1. A temperature control system having, in combination, a valve actuating shaft movable between valve open and valve closed positions, a reversible power actuator therefor, a thermostat controlling the operation of said actuator to change the position of said shaft in proportion to ambient temperature changes, a damper operating member movable between closed and open positions through a predetermined partially open third position, a reversible motor for said member, a thermostatic switch controlling said motor to move the member to said open position in response to a rise in the ambient temperature above a predetermined value and to said third position in response to a temperature fall below such value, switching mechanism actuated in response to changes in the position of said shaft and operable to place said motor under the control of said thermostatic switch when the shaft is in closed or partially open position but out of such control when the shaft is in said open position, and switching means actuated by said shaft and operable to control said motor independently to cause the same to move said member to said closed position.

2. A temperature control system having, in combination, a valve actuating shaft movable between valve open and valve closed positions, a reversible power actuator therefor, a thermostat controlling the operation of said actuator to change the position of said shaft in proportion to ambient temperature changes, a damper operating member movable between closed and open positions through a predetermined partially open third position, a reversible operator for said member, a second thermostat controlling said operator to move the member to said open position in response to a rise in the ambient temperature above a predetermined value and to said third position in response to a temperature fall below such value, mechanism actuated in response to changes in the position of said shaft and operable to place said damper operator under the control of said second thermostat when the shaft is in closed or partially open position but out of such control when the shaft is in said open position, and means actuated by said shaft and operable to control said operator independently to cause the same to move said member to said closed position.

3. A temperature control system having, in combination, a reversible valve actuator having a driven element movable between valve open and valve closed positions, a thermostat controlling said actuator to variably position said element in proportion to ambient temperature changes within a predetermined range, a reversible damper operator having a driven member movable between damper open and closed positions through a third intermediate position, means responsive to the movements of said element and controlling said operator to maintain said member in said damper closed position when said element is in said valve open position, a second thermostat adapted when in control of said operator to cause movement of said member to said third position when the ambient temperature is below a predetermined value and toward the open position when such temperature is above such value, and mechanism operated selectively in response to movements of said element to disable said first mentioned means and to transfer the control of said operator to said second thermostat when the element is disposed either in said valve closed position or between its open and closed positions.

4. A system for controlling the operation of a heater and an associated air flow control damper having, in combination, a reversible power actuator having a driven element movable between limit heat increasing and heat decreasing positions, a thermostat controlling said actuator to variably position said element, a reversible damper operator having a driven member movable between damper first and second positions through a third intermediate position, means responsive to the movements of said element and controlling said operator to maintain said member in said first position when said element is in said heat-increasing position, a second thermostat adapted when in control of said operator to cause movement of said member to said third position when the ambient temperature is below a predetermined value and toward said second position when such temperature is above such value, and mechanism operated selectively in response to movements of said element to disable said first mentioned means and to transfer the control of said operator to said second thermostat when the element is in said heat-decreasing position or disposed between said heat-increasing and heat-decreasing positions.

5. A temperature control system having, in combination, a reversible actuator having a driven element movable between minimum and maximum heating positions, a thermostat controlling said actuator to variably position said element, a reversible damper operator having a driven member movable between positions of minimum and maximum damper opening through an intermediate position, means responsive to the movements of said element and controlling said operator to maintain said member in said minimum position when said element is in its maximum heating position, a second thermostat adapted when in control of said operator to cause movement of said member to said intermediate position when the ambient temperature is below a given value and toward its maximum position when such temperature is above such value, and mechanism operated selectively in response to movements of said element to disable said first mentioned means when the element is moved from said maximum heating position and to transfer the control of said operator to said second thermostat when the element is between its maximum and minimum positions.

THEODORE K. GREENLEE.

REFERENCES CITED

The following references are of record in the file of this patent:

UNITED STATES PATENTS

| Number | Name | Date |
|---|---|---|
| 2,290,985 | McElgin | July 28, 1942 |
| 2,315,517 | Greenlee | Apr. 6, 1943 |